Oct. 15, 1929.　　D. L. MURPHY ET AL　　1,731,259
CORN HARVESTING MACHINE
Filed Dec. 26, 1922　　3 Sheets-Sheet 1

INVENTOR.
Dan L. Murphy
BY Charles Fickau
Morsell + Keeney
ATTORNEYS.

Oct. 15, 1929.  D. L. MURPHY ET AL  1,731,259
CORN HARVESTING MACHINE
Filed Dec. 26, 1922  3 Sheets-Sheet 3

INVENTOR.
Dan L. Murphy
BY Charles Fickan
Morsell & Keeney
ATTORNEYS.

Patented Oct. 15, 1929

1,731,259

UNITED STATES PATENT OFFICE

DAN L. MURPHY, OF VELVA, NORTH DAKOTA, AND CHARLES FICKAU, OF TESS CORNERS, WISCONSIN

CORN-HARVESTING MACHINE

Application filed December 26, 1922. Serial No. 608,993.

This invention relates to a corn harvesting machine, and particularly to a machine adapted to harvest corn and reduce it to ensilage.

One of the particular objects of the invention is to provide a harvesting machine of this type which will cut standing corn, convey the same rearwardly of the machine in an upright position, and deposit the same on a transversely arranged conveyer, with the butt ends of the severed stalks in the direction of feed of the transverse conveyer, whereby the same will be conveyed to a cutter and reduced to ensilage, whereupon it will be conveyed by a delivery conveyer to some receptacle, as a wagon or the like.

A feature of the invention consists in providing means for adjustably mounting a set of gathering or stalk guiding members, whereby the same may be made to accommodate rows of corn spaced at varying distances. The invention further contemplates the provision of means for adjustably arranging the gathering frames with reference to the ground.

The invention further consists in the novel combination, construction and arrangement of parts, all of which will be made more apparent hereinafter, as the description proceeds, especially when considered in connection with the accompanying drawings wherein;

Fig. 4 is a detail sectional view, taken on the plane indicated by line 4—4 in Fig. 3.

Figure 1:
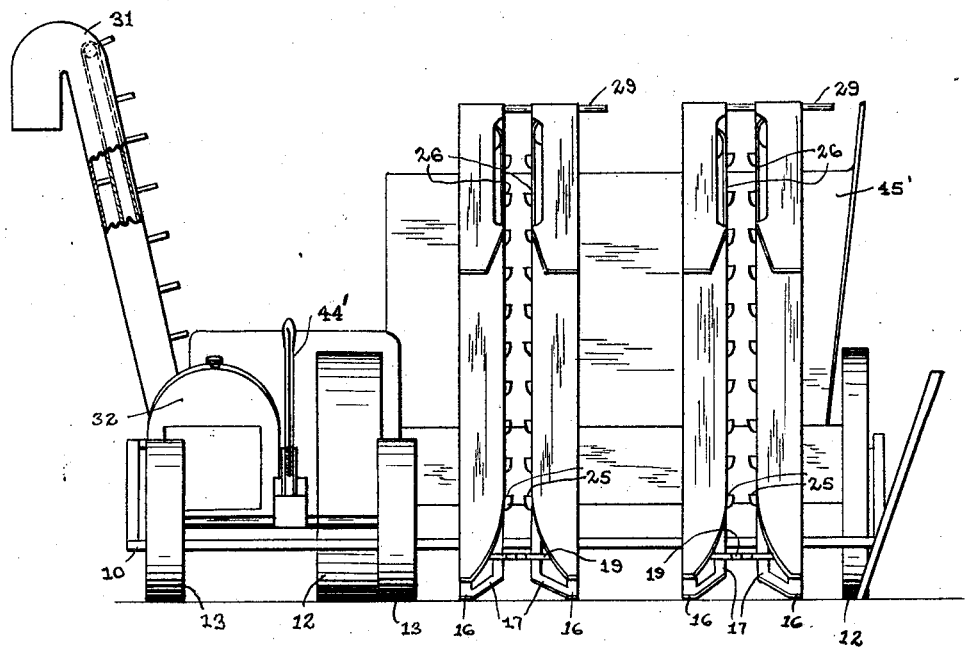
Figure 1 is a front elevation of a harvesting machine constructed in accordance with my invention.
Figure 2:
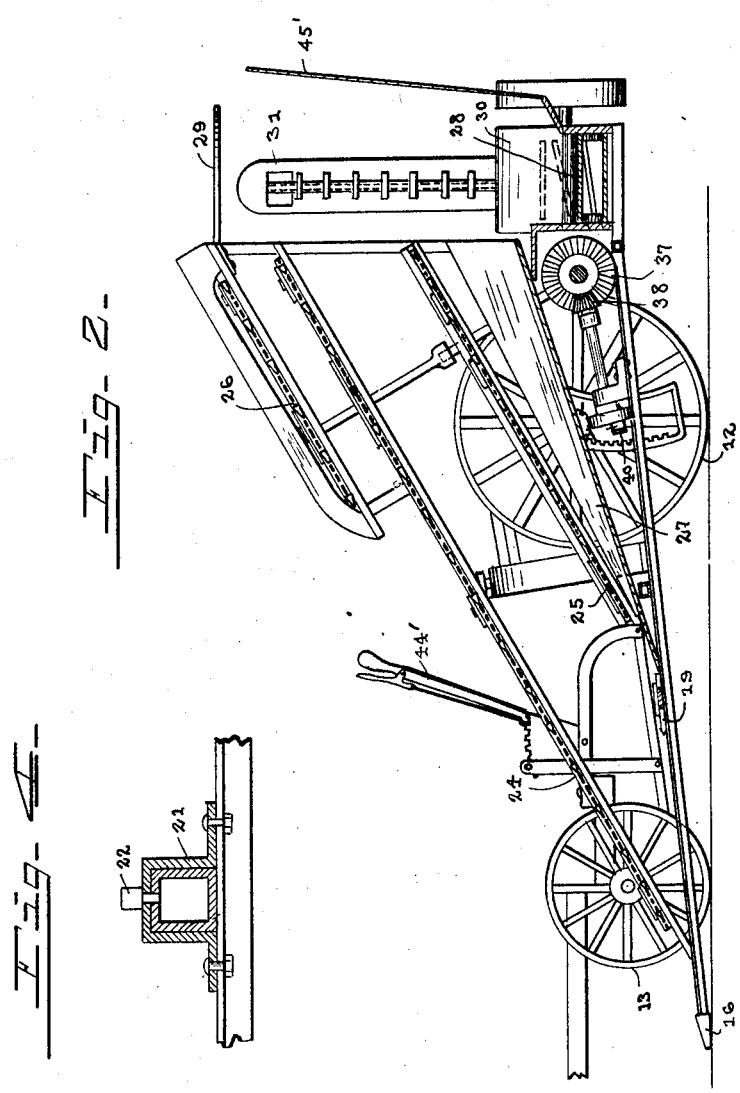
Fig. 2 is a vertical longitudinal sectional view, through the machine.

Referring now more particularly to the drawings wherein like reference characters indicate like parts, it will be noted that there is provided a frame 10, having a supplemental frame 11, extending therefrom at one side. A pair of main wheels 12, support the frame so that the same will be mobile, while a pair of front wheels 13 are provided whereby the machine may be guided.

Mounted upon the frame of the machine is a pair of stalk guiding members or gathering frames, 14 and 15, which are provided with spaced forward ends 16, from which extend rearwardly converging guide members 17, for the purpose of guiding the stalks to cutters 18. The cutters are provided with the reciprocating knives 19, adjustably connected together, as indicated at 20, for a purpose to be later described. One of the gathering frames, herein designated by the reference character 15, has secured thereto a housing 21, through which projects a pin 22. This pin is adapted to enter any one of a plurality of apertures 23, formed in the frame 11, whereby the position of this gathering frame may be adjusted with reference to the gathering frame 14, and variance in the distance between the rows of corn compensated for.

Spaced above the gathering frames are endless conveyers, 24, 25, and 26, these conveyers being arranged in spaced relation above each gathering frame. The stalks are first engaged by the conveyer 24, thereafter engaged by the conveyer 25, and are finally engaged by the conveyer 26, and are thus moved backwardly in an upright position. To assist in this there is provided for each gathering frame a pan or guide 27 upon which the butt ends of the stalks rest.

Arranged transversely at the rear of the machine is an endless conveyer 28, upon which the severed stalks are adapted to be deposited by means of the conveyers 24, 25, and 26. For the purpose of positioning the stalks upon the conveyer 28, with their butt ends in the direction of feed, there are provided deflecting arms 29, which engage the stalk and cause it to be deposited upon the conveyer 28 with the butt ends toward an ensilage cutter 30. The stalks are therefore fed by the conveyer 28 to the ensilage cutter. The delivery conveyer 31, associated with the ensilage cutter, is adapted to deliver the ensilage to a receptacle, such as a wagon or the like.

Mounted upon the main frame of the machine is a power plant, herein shown as an engine 32, which is connected by gearing 33 to the conveyer 28, the cutter 30, and the delivery conveyor 31, whereby these portions of the machine are operated.

Arranged transversely of the machine is a shaft 34 which is connected by a chain 35 to one of the wheels 12. A clutch 36 is interposed in the connection so that the shaft 34 may be uncoupled from the wheel 12. Fixed to the shaft 34 is a bevelled gear 37, meshing with the bevelled pinion 38, which is fixed to a shaft 39, which has a link and wrist-pin connection 40 with an oscillating member 41, pivoted to the frame as at 42, and connected as at 43 to the blades 19. In this manner the blades 19 are reciprocated. By means of vertically disposed shafts 44, and bevelled pinions 45, power is transmitted from the shaft 34 to the endless conveyers, 24, 25, and 26.

A hand lever 44' is provided for raising and lowering the gathering members, whereby the height of these members with reference to the ground travelled over may be regulated.

Arranged around the back of the machine is a shield 45', which prevents the severed stalks from dropping off the rear. A single or double tree 46 is preferably provided whereby draft animals may be attached to the machine for pulling the same over the ground.

Figure 3:
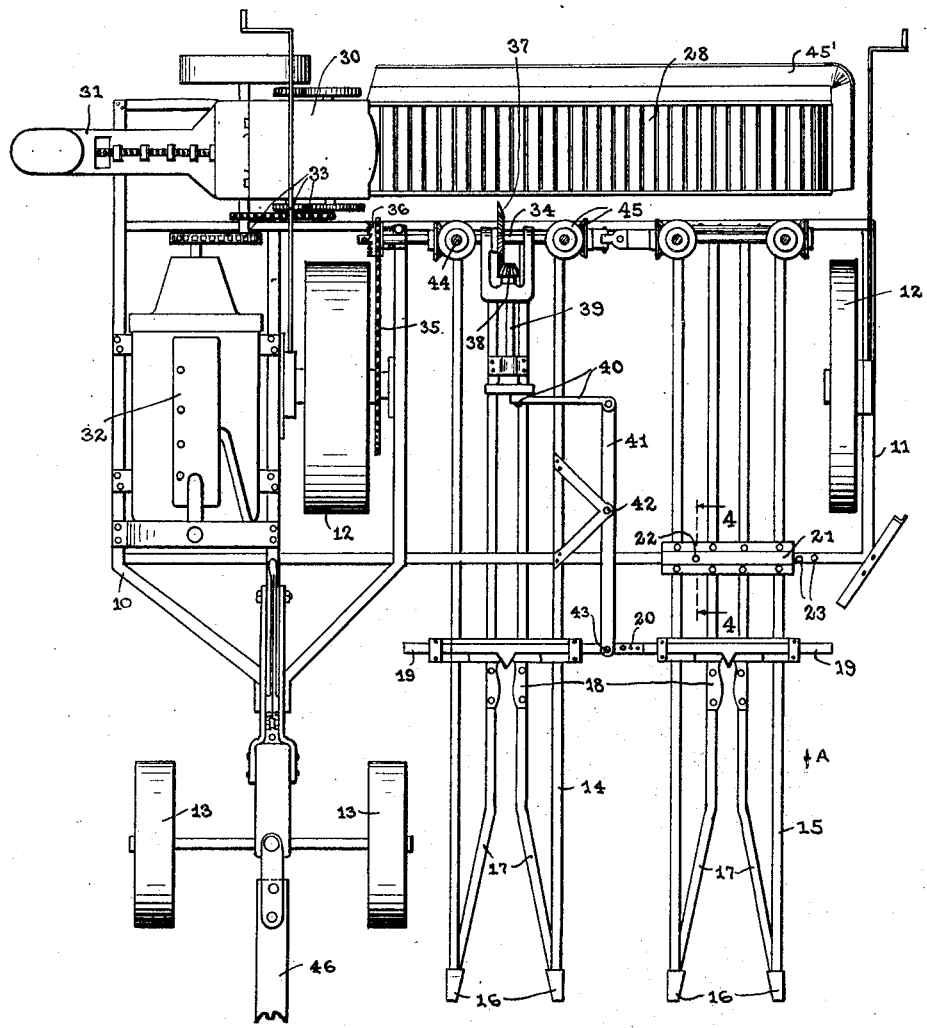
Fig. 3 is a sectional plan view.

An adjustment similar to that shown in Figs. 3 and 4 is provided for the rear end of the gathering frame 15, and provision is made for lengthening and shortening the shaft 34, by the insertion or removal of detachable links or shaft sections, between the frames 14 and 15, through the medium of a detachable coupling 34'.

In practice the gathering members, 14 and 15, are adjusted to the distance between the rows of stalks to be cut and the machine drawn forwardly over the ground by means of the single or double tree 46. The stalks are directed by the gathering members toward the severing means, whereby the stalks are cut. The stalks are first engaged by the conveyers 24, and immediately after they are cut the butt ends of the stalks are moved into engagement with the inclined pans 27. The stalks are thereafter engaged by the conveyers 25 and lastly by the conveyers 26 so that they are caused to travel rearwardly of the machine in a substantially upright position.

As they reach the rear ends of the conveyers they are dropped upon the transverse conveyer 28, the deflecting arms 29 causing the stalks to fall with the butt ends toward the ensilage cutter 30. The stalks are thereupon fed to the ensilage cutter, where they are reduced to ensilage, and the ensilage delivered by the delivery conveyer 31. As mentioned hereinbefore, the conveyers 28 and 31, as well as the cutter 30, are operated preferably by means of the engine 32, while the reciprocating knives and the conveyers 24, 25, and 26 are driven from power obtained from one of the wheels 12.

From the foregoing it will be apparent that there is provided a harvesting machine, whereby the corn may be severed, reduced to ensilage, and delivered, all in the order named, and practically by a continuous operation as the machine is drawn through the field.

Obvious modifications will suggest themselves, and to this end reservation is made to make such changes as may come within the purview of the accompanying claim.

Having thus described the invention what is claimed is:

In a corn harvesting machine, a supporting frame; a pair of gathering frames carried by said supporting frame, one of which is adjustably mounted whereby the distance between said gathering frames may be varied; stalk severing means associated with each gathering frame; conveyers mounted on each of said gathering frames, for moving the stalks from said severing means toward the rear of the machine; an ensilage cutter mounted on said supporting frame; a transverse conveyer for receiving the severed stalks from said gathering frame conveyers, and transporting them to said cutter; means for driving said gathering frame conveyers and severing means, including a transverse shaft, means whereby the length of said shaft may be increased or decreased to permit of the adjustment of said gathering frames; and means for driving said shaft.

In testimony whereof, we affix our signatures.

DAN L. MURPHY.
CHARLES FICKAU.